(12) United States Patent  
Thakkar et al.

(10) Patent No.: US 8,297,761 B2  
(45) Date of Patent: Oct. 30, 2012

(54) RETROREFLECTIVE ARTICLES COMPRISING OLEFINIC SEAL FILMS

(75) Inventors: Bimal V. Thakkar, Woodbury, MN (US); Jeffrey O. Emslander, Afton, MN (US); Steven M. Nielsen, Hastings, MN (US); Douglas J. Hall, St. Paul, MN (US); David G. Schueler, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/562,243

(22) Filed: Sep. 18, 2009

(65) Prior Publication Data

US 2010/0007954 A1 Jan. 14, 2010

Related U.S. Application Data

(62) Division of application No. 11/379,130, filed on Apr. 18, 2006, now Pat. No. 7,611,251.

(51) Int. Cl.
*G02B 5/124* (2006.01)
*G02B 5/12* (2006.01)

(52) U.S. Cl. ........................................ 359/530; 359/515

(58) Field of Classification Search .................. 359/530
See application file for complete search history.

(56) References Cited

U.S. PATENT DOCUMENTS

| | | | |
|---|---|---|---|
| 3,684,348 A | 8/1972 | Rowland | |
| 3,689,346 A | 9/1972 | Rowland | |
| 3,712,706 A | 1/1973 | Stamm | |
| 3,811,983 A | 5/1974 | Rowland | |
| 4,025,159 A | 5/1977 | McGrath | |
| 4,202,600 A | 5/1980 | Burke et al. | |
| 4,208,090 A | 6/1980 | Heenan | |
| 4,243,618 A | 1/1981 | Van Arnam | |
| 4,332,847 A | 6/1982 | Rowland | |
| 4,576,850 A | 3/1986 | Martens | |
| 4,588,258 A | 5/1986 | Hoopman | |
| 4,601,861 A | 7/1986 | Pricone et al. | |
| 4,775,219 A | 10/1988 | Appeldorn et al. | |
| 4,938,563 A | 7/1990 | Nelson et al. | |
| 5,117,304 A | 5/1992 | Huang et al. | |
| 5,272,562 A | 12/1993 | Coderre | |
| 5,450,235 A | 9/1995 | Smith et al. | |
| 5,491,586 A | 2/1996 | Phillips | |
| 5,642,222 A | 6/1997 | Phillips | |
| 5,691,845 A | 11/1997 | Iwatsuka et al. | |

(Continued)

FOREIGN PATENT DOCUMENTS

EP 0714040 B1 11/2004

(Continued)

OTHER PUBLICATIONS

U.S. Appl. No. 60/745,033, filed Apr. 18, 2006.

(Continued)

*Primary Examiner* — Jade R Chwasz
(74) *Attorney, Agent, or Firm* — Sandra K. Nowak; Lisa P. Fulton

(57) ABSTRACT

Microstructured articles, such as a retroreflective articles, having a plurality of (e.g. cube-corner) microstructured elements and a seal film layer adhered to portions of the cube-corner elements and/or portions of a (e.g., flexible) body layer. The seal film is a thermoplastic polymeric material comprising reaction products of alkylene in an amount of at least about 50% and reaction products of at least one non-acidic polar monomer.

26 Claims, 3 Drawing Sheets

U.S. PATENT DOCUMENTS

| | | | |
|---|---|---|---|
| 5,691,846 A | 11/1997 | Benson, Jr. et al. | |
| 5,691,856 A | 11/1997 | Kardash | |
| 5,784,197 A | 7/1998 | Frey et al. | |
| 5,930,041 A | 7/1999 | Thielman | |
| 5,936,770 A | 8/1999 | Nestegard et al. | |
| 5,988,820 A | 11/1999 | Huang et al. | |
| 6,004,422 A | 12/1999 | Janovec et al. | |
| 6,039,909 A | 3/2000 | Bernard et al. | |
| 6,142,643 A | 11/2000 | Araki et al. | |
| 6,143,224 A | 11/2000 | Bernard et al. | |
| 6,231,797 B1 | 5/2001 | Bernard et al. | |
| 6,318,867 B1 | 11/2001 | Bacon, Jr. et al. | |
| 6,350,035 B1 | 2/2002 | Smith et al. | |
| 6,677,028 B1 | 1/2004 | Lasch et al. | |
| 6,677,030 B2 | 1/2004 | Thakkar et al. | |
| 6,899,944 B2 | 5/2005 | Tanaka et al. | |
| 7,442,442 B2 | 10/2008 | Strobel et al. | |

FOREIGN PATENT DOCUMENTS

| | | |
|---|---|---|
| WO | WO 95/11466 | 4/1995 |
| WO | WO 97/16753 | 5/1997 |
| WO | WO 00/42453 | 7/2000 |

OTHER PUBLICATIONS

DuPont™ Elvaloy® 4924 ethylene copolymer resin, Product Data Sheet dated 2002.
DuPont™ Surlyn® 1705-1 data sheet dated Mar. 2004.
DuPont™ Elvax® 3134Q data sheet dated Jul. 2004.
DuPont™ Elvax® 3124 data sheet dated Mar. 7, 2007.
DuPont™ Elvax® 3170 data sheet dated Mar. 7, 2007.
DuPont™ Elvax 3174 data sheet dated Mar. 7, 2007.
DuPont™ Elvax 3190 data sheet dated Mar. 7, 2007.
DuPont™ Bynel® 3100 Series adhesive resins data sheet dated Sep. 9, 2005.
DuPont™ Bynel® 21E533 data sheet dated Dec. 9, 2003.
DuPont™ Bynel® 22E757 Series 2200 Modified Ethylene Acrylate data sheet dated Jan. 8, 2010.
DuPont™ Bynel® Series 2000 adhesive resins data sheet dated Sep. 9, 2005.
"DuPont™ Elvax® Grade Selection Guide for Adhesives, Sealants and Wax Blends", Dupont Company [on line], Sep. 9, 2005, <http://www.dupont.com/industrial-polymers/elvax/H-19829-3/H-19829-3.html>.

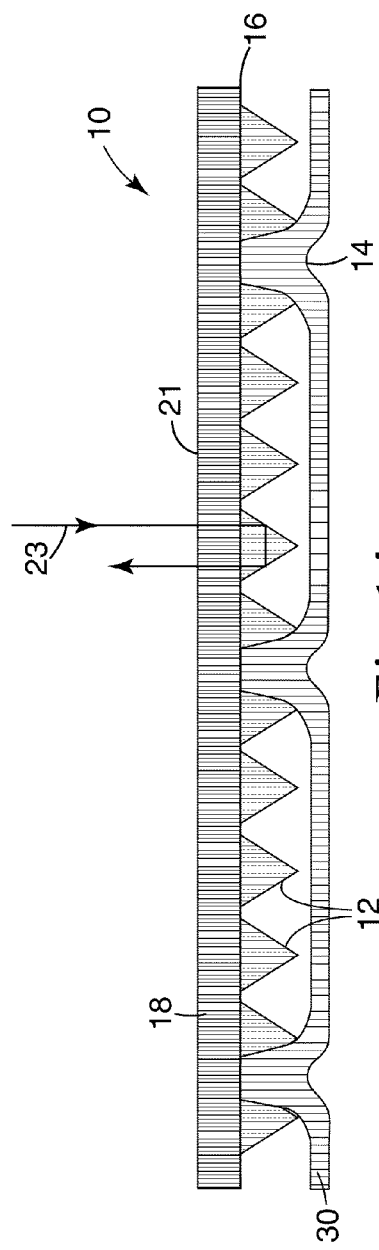
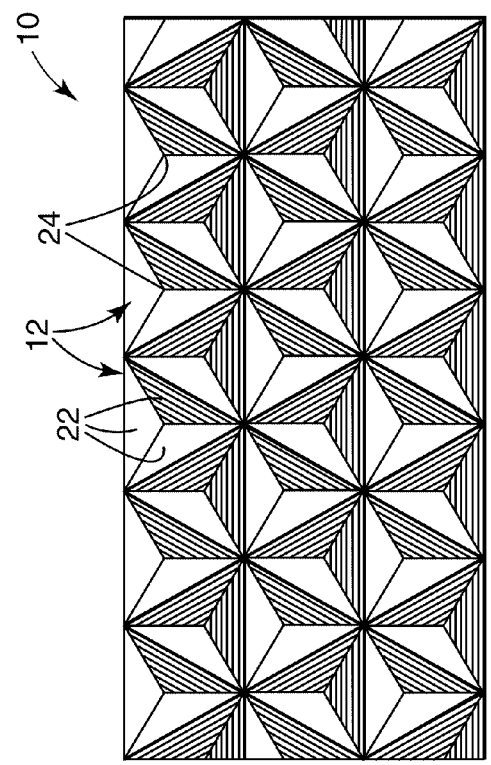

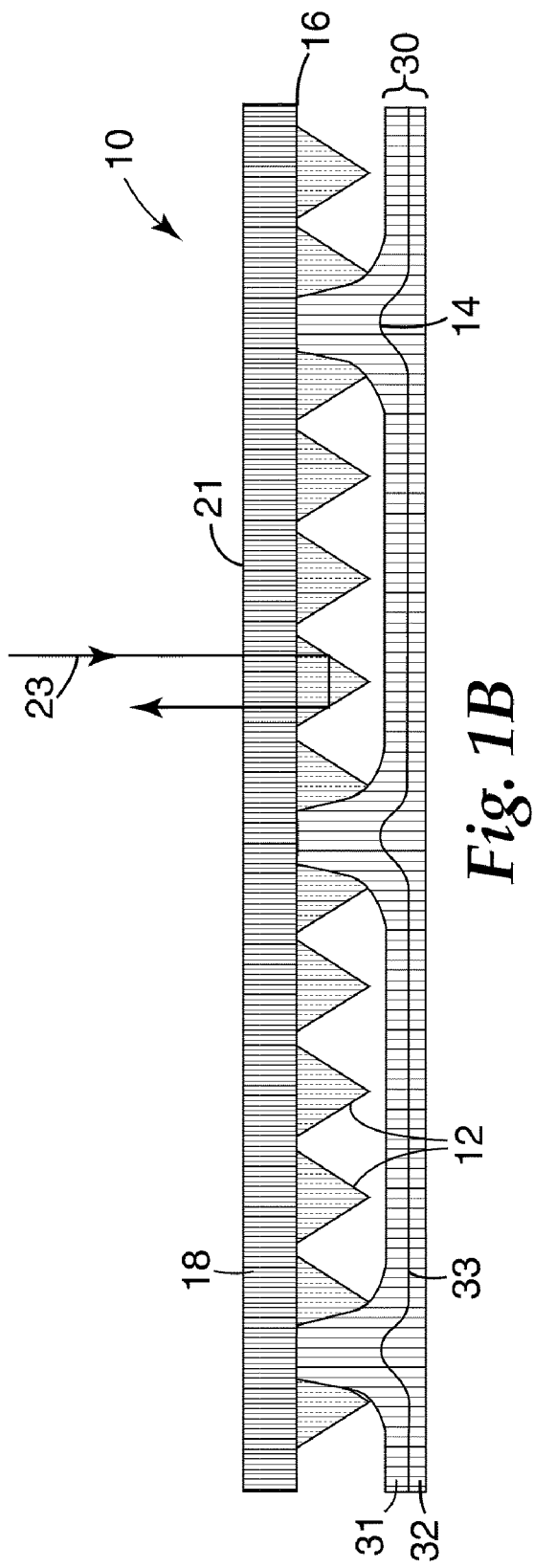

RETROREFLECTIVE ARTICLES COMPRISING OLEFINIC SEAL FILMS

RELATED APPLICATION

This application is a division of U.S. application Ser. No. 11/379,130, filed Apr. 18, 2006 now U.S. Pat. No. 7,611,251.

BACKGROUND

Retroreflective sheetings have the ability to redirect incident light towards its originating source. This ability has led to the wide-spread use of retroreflective sheetings on a variety of articles. There are essentially two types of retroreflective sheeting: beaded sheeting and cube-corner sheeting. Beaded sheeting employs a multitude of glass or ceramic microspheres to retroreflect incident light. Cube-corner sheeting, on the other hand, typically employs a multitude of rigid, interconnected, cube-corner elements to retroreflect incident light.

A specular reflective coating such as a metallic coating can be placed on the backside of the cube-corner elements to promote retroreflection. In addition to or in lieu of a metallic coating, a seal film can be applied to the backside of the cube-corner elements. The sealing film maintains an air interface at the backside of the cubes to enhance retroreflectivity.

Various sealing films suitable for use with flexible retroreflective sheeting have been described. See for example U.S. Pat. Nos. 5,784,197; 5,691,846; and 6,318,867.

SUMMARY

In one embodiment, a flexible retroreflective article is described comprising a polymeric light transmissive body layer having an elastic modulus of less than $7 \times 10^8$ pascals and a plurality of cube-corner elements projecting from a major surface of the body layer; and a seal film adhered to portions of the body layer.

In another embodiment, a (e.g. retroreflective) microstructured article is described that comprises a plurality of (e.g., cube-corner) microstructured elements and a seal film layer adhered to portions of the cube-corner elements.

In each of these embodiments, the seal film is a thermoplastic polymeric material comprising reaction products of (e.g. ethylene) alkylene in an amount of at least about 50% and reaction products of at least one non-acidic polar comonomer such as vinyl acetate, alkyl(meth)acrylate monomers, and mixtures thereof. The thermoplastic polymeric material of the seal film may optionally further comprise acid modification, anhydride modification, carbon monoxide modification, and combinations thereof. The alkylene of the thermoplastic material comprises 2 to 8 carbon atoms and more typically 2 to 3 carbon atoms. The alkyl of the alkyl (meth)acrylate typically comprises 1 to 8 carbon atoms and more typically 1 to 4 carbon atoms.

In some aspects, the seal film comprises a copolymer or terpolymer of alkylene and at least one comonomer selected from vinyl acetate; alkyl(meth)acrylate monomers, and mixtures thereof. The copolymer or terpolymers typically comprises about 5 wt-% to about 40 wt-% of vinyl acetate, alkyl (meth)acrylate monomers, and mixtures thereof. The seal film may be selected from an anhydride modified alkylene (meth)acrylate polymer, an acid modified alkylene (meth) acrylate polymer, an acid/acrylate modified ethylene vinyl acetate polymer, an alkylene vinyl acetate carbon monoxide copolymer, and mixtures thereof.

In other aspects, the seal film comprises a blend of at least two thermoplastic polymers and the blend comprises reaction products of alkylene in an amount of at least about 50% and reaction products of at least one non-acidic polar comonomer such as vinyl acetate, alkyl(meth)acrylate monomers, and mixtures thereof. The seal film may be monolithic (i.e., a single layer) or multilayered, having a seal film layer disposed between the cube-corner elements and one or more additional film layers.

In another embodiment, a method of making a retroreflective article is described comprising thermally bonding the seal film to at least portions of the body layer.

BRIEF DESCRIPTION OF THE DRAWINGS

FIG. 1A is a cross-sectional view of an embodiment of cube-corner retroreflective sheeting including a sealing film.

FIG. 1B is a cross-sectional view of an embodiment of cube-corner retroreflective sheeting including a multilayered sealing film.

FIG. 3 is a perspective view of an embodied cube-corner surface.

DETAILED DESCRIPTION OF PREFERRED EMBODIMENTS

Figure 2:
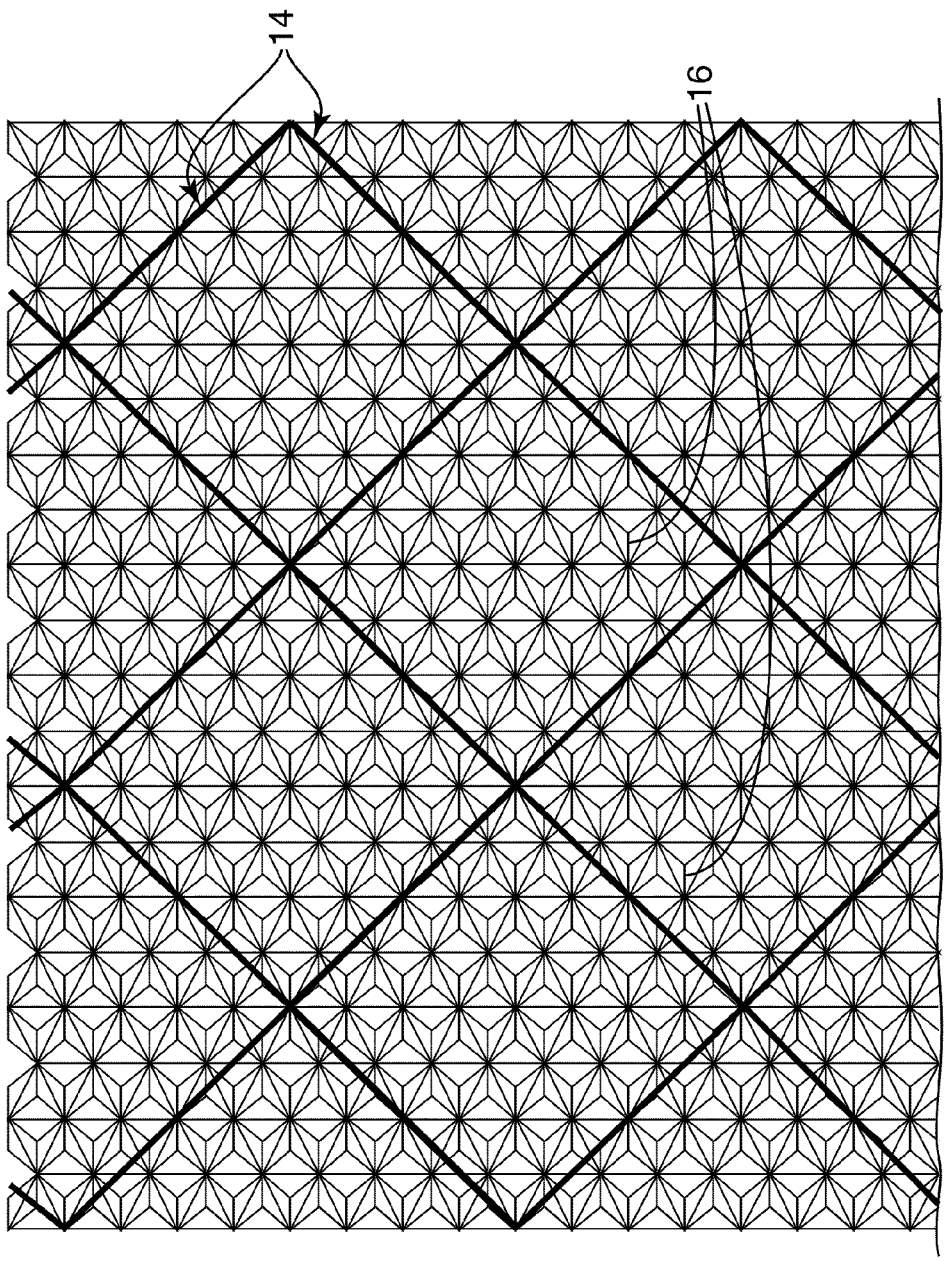
FIG. 2 is a perspective view of an embodiment of cube-corner retroreflective sheeting.

The invention relates to microstructured (e.g., cube-corner retroreflective) articles including a seal film (also referred to as a sealing film) that substantially covers the microstructured surface. In some embodiments, the microstructures are provided on a (e.g. flexible) body layer. The microstructures and the body layer are typically light transmissive. The seal film is typically bonded to portions of the body layer and/or (e.g., cube-corner microstructured surface. Although the present invention will be described with reference to (e.g., flexible) retroreflective sheeting, the seal film described herein may be suitable for bonding to other microstructured surfaces as well.

The term "microstructure" is used herein as defined and explained in U.S. Pat. No. 4,576,850. Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g. from +/−0.005+/−0.1 or, preferably, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g. from +/−0.1 to +/−750 microns, and attributable to microstructure comprising a plurality of utilitarian discontinuities which are the same or different and spaced apart or contiguous in a random or ordered manner.

With reference to FIGS. 1A and 1B, exemplary cube-corner retroreflective sheeting 10 comprises a multitude of cube-corner elements 12 and a body layer 18. Body layer 18 may also be referred to as an overlay film as well as a base substrate. Body layer 18 typically has a thickness of at least 20 micrometers and more typically at least 50 micrometer. Body layer 18 usually has a thickness less than 1,000 micrometer, and typically no greater than 250 micrometers. The cube-corner elements 12 project from a first, typically rear side of body layer 18.

The cube-corner elements and body layer are typically formed from a light transmissive polymeric material. This means that the polymer is able to transmit at least 70 percent of the intensity of the light incident upon it at a given wavelength. More preferably, the polymers that are used in the retroreflective sheeting of the invention have a light transmissibility of greater than 80 percent, and more preferably greater than 90 percent. When the retroreflective sheeting is employed for uses other than traffic safety, such as advertising displays, the light transmissibility may be as low as 5 to 10 percent.

In a preferred embodiment, the body layer 18 is the outermost layer on the front side of the sheeting 10. As shown in FIG. 1, light enters the cube-corner sheeting 10 through the front surface 21. The light then passes through the body portion 18 and strikes the planar faces of the cube-corner elements 12 and returns in the direction from which it came as shown by arrow 23. The body layer 18 functions to protect the sheeting from outdoor environmental elements and/or provides mechanical integrity to the sheeting.

The cube-corner retroreflective sheeting may include a land layer such as shown in U.S. Pat. No. 5,450,235. In some embodiments, the land layer is integral with the cube-corner elements meaning that the land and cubes are formed from a single polymeric material—not two different polymeric layers subsequently united together. Particularly for embodiments, wherein the retroreflective sheeting is flexible, the land layer 16, typically, has a thickness in the range of about 0 to 150 micrometers, and preferably in the range of approximately about 1 to 100 micrometers. The thickness of the land is preferably no greater than 10 percent of the height of the cube corner elements, and more preferably about 1 to 5 percent thereof. In sheetings having thicker land portions, it is typically more difficult to achieve decoupling of individual cube corner elements.

The cube-corner elements 12 typically have a height in the range of about 20 to 500 micrometers, and more typically in the range of about 35 to 100 micrometers. Although the embodiment of the invention shown in FIG. 1 has a single body layer 18, it is within the scope of the present invention to provide more than one body layer 18 (e.g., a multi-layer body). A seal film 30 is bonded to the (e.g., cube-corner) structured surface, i.e., on the opposite side of the body layer film. The seal film typically functions to maintain an air interface with the (e.g., backside) of the cube-corner elements to enhance retroreflectivity. Seal films can also be employed to impart color or protect the cube-corner elements from environmental factors.

As shown in FIG. 2, a network of narrow intersecting bonds 14 extend over the entire (e.g., back) surface. The pattern of sealing regions or legs thereby creates cells 16. The sealing regions can form various patterns that often are contiguous polygons such as parallelograms, triangles, and hexagons.

The sheeting can also include a seal coat as described in U.S. Pat. No. 5,784,197, a backing and/or an adhesive layer on the seal film in order that the cube-corner retroreflective sheeting can be secured to a substrate.

FIG. 3 illustrates a perspective view of the cube-corner element surface which is typically the back side of the article. As shown, the cube-corner elements 12 are disposed as matched pairs in an array on one side of the sheeting. Each cube-corner element 12 has the shape of a trihedral prism with three exposed planar faces 22. The planar faces 22 may be substantially perpendicular to one another (as in the corner of a room) with the apex 24 of the prism vertically aligned with the center of the base. The angle between the faces 22 typically is the same for each cube-corner element in the array and will be about 90 degrees. The angle, however, can deviate from 90 degrees as is well-known. See, for example, U.S. Pat. No. 4,775,219 to Appledorn et al. Although the apex 24 of each cube-corner element 12 may be vertically aligned with the center of the base of the cube-corner element, see, for example, U.S. Pat. No. 3,684,348. The apex also may be canted to the center of the base as disclosed in U.S. Pat. No. 4,588,258. The present invention is not limited to any particular cube-corner geometry. Various cube-corner configurations are known such as described in U.S. Pat. Nos. 4,938,563, 4,775,219, 4,243,618, 4,202,600, and 3,712,706. The cube-corner configurations described in U.S. Pat. No. 4,588,258 can provide wide angle retroreflection among multiple viewing planes.

A specular reflective coating such as a metallic coating (not shown) can also optionally be placed on the backside of the cube-corner elements to promote retroreflection. The metallic coating can be applied by known techniques such as vapor depositing or chemically depositing a metal such as aluminum, silver, or nickel. A primer layer may be applied to the backside of the cube-corner elements to promote the adherence of the metallic coating.

Presently described are seal films for (e.g. flexible) retroreflective articles. The seal film is a thermoplastic polymeric material comprising reaction products of alkylene in combination with reaction products of at least one non-acidic monomer.

The alkylene component is low cost and provides durability (e.g. chemical resistance and cold temperature impact resistance) to the seal films. The amount of alkylene of the polymeric material of the seal film is typically at least about 50% by weight. In some embodiment, the amount of alkylene is 55 wt-%, 60 wt-%, 65% wt-%, 70 wt-%, 75 wt-%, or 80 wt-%. Alkylene components having two (i.e., ethylene) to eight (i.e., octene) carbon atoms are typically employed in the manufacture of films with ethylene, and (iso)propylene to a lesser extent, being the most common.

The non-acidic monomer improves the adhesion of the seal film to the body layer and/or cube-corner elements. The non-acidic monomer reaction products typically total at least 1 wt-% and more typically at least 10 wt-%. Further, the total amount of non-acidic comonomer reaction products generally ranges up to about 40 wt %. The total amount of non-acidic comonomer reaction products may range up to about 32 wt-%, or 25 wt-%, particularly when the seal film is monolithic (i.e., a single layer).

Preferred non-acidic monomers include vinyl acetate and alkyl(meth)acrylate. Vinyl acetate has the structure $CH_3COOCH=CH_2$; whereas (meth)acrylate monomers are a class of monomers having a polymerizable $CH_2=CH-$ (i.e., acrylate) group or a terminal $CH_2=C(CH_3)-$ (i.e., methacrylate group). Acrylate tends to be preferred since such group is more reactive than a methacrylate group. Alkyl (meth)acrylate monomers have the general structure $CH_2=CHCOOC_nH_{2n-1}$. Although, n may range from 1 to 12, n is commonly no greater than 8 with methyl acrylate $CH_2=CHCOOCH_3$, ethyl acrylate $CH_2=CHCOOC_2H_5$, methyl methacrylate $CH_2=C(CH_3)COOCH_3$, and ethyl methacrylate $CH_2=C(CH_3)COOC_2H_5$ being most commonly employed in the manufacture of films.

In one embodiment, the seal film comprises a copolymer or terpolymer of alkylene and at least one comonomer selected from vinyl acetate, alkyl(meth)acrylate monomers, and the various comonomer mixtures thereof. Accordingly, the seal film may comprise of reaction products of alkylene and vinyl acetate, alkylene and a single alkyl(meth)acrylate monomer, alkylene and a combination of vinyl acetate and at least one alkyl (meth)acrylate monomer, alkylene and a combinations of two or more alkyl(meth)acrylate monomers.

The thermoplastic polymeric material of the seal film may optionally comprise acid modification, anhydride modification, carbon monoxide modification, and combinations thereof. For example, the seal film may comprise a terpolymer of alkylene; at least one comonomer selected from vinyl acetate, alkyl(meth)acrylate monomers, and mixtures thereof, and at least one additional comonomer including for example acrylic acid $H_2C=CHCOOH$, methacrylic acid $H_2C=C(CH_3)COOH$, (meth)acrylic acid (e.g. maleic) anhydride, carbon monoxide, and mixtures thereof. The amount of such additional comonomer typically ranges up to about 10 wt-%

In general, as the percentage of alkylene is decreased, the percentage of non-acidic polar monomer is increased, thereby increasing the seal film's flexibility increases. However, the inclusion of small amount of acidic or anhydride modification can decrease the flexibility in comparison to a copolymer having the same amount of non-acid polar comonomer.

Suitable copolymers include copolymers of ethylene with vinyl acetate (EVA); acid- or anhydride-modified EVAs; other modified EVAs, such as acid or anhydride-/acrylate-modified EVAs; ethylene ethyl acrylate copolymers (EEA); ethylene methyl acrylate copolymers (EMA); acid- or anhydride-modified ethylene acrylate materials (AEA); ethylene vinyl acetate, carbon monoxide terpolymers (EVACO); ethylene, butyl acrylate, carbon monoxide terpolymers (EBACO); and ethylene n-butyl acrylate copolymers (EnBA).

Suitable EVAs (copolymers of ethylene with vinyl acetate) for use in seal films of the present invention include resins from DuPont available under the trade designation "Elvax". Typical grades range in vinyl acetate content from 9 to 40 weight percent and in melt index from 0.3 to 500 dg/min. (per ASTM D1238). Suitable EVAs also include high vinyl acetate ethylene copolymers from Equistar available under the trade designation "Ultrathene". Typical grades range in vinyl acetate content from 12 to 18 weight percent. Suitable EVAs also include EVA copolymers from AT Plastics available under the trade designation ATEVA. Typical grades range in vinyl acetate content from 2 to 26 weight percent.

Exemplary commercially available seal film materials are depicted in the following table:

| Generic Chemical Description | Trade Designation | Comonomer | Melt Index (ASTM D 1238) | Vicat Softening Point (ASTM D1525) | Melt Point (ASTM D3417) |
|---|---|---|---|---|---|
| ethylene-vinyl acetate copolymer resin | "Elvax 3134Q" | 12%, by wt, vinyl acetate | 8 g/10 min | 71° C. (160° F.) | 95° C. (203° F.) |
| ethylene-vinyl acetate copolymer resin | "Elvax 3124" | 9%, by wt, vinyl acetate | 7 g/10 min | 77° C. (171° F.) | 98° C. (208° F.) |
| ethylene vinyl-acetate copolymer resin | "Elvax 3170" | 18%, by wt, vinyl acetate | 2.5 g/10 min | 65° C. (149° F.) | 87° C. (189° F.) |
| ethylene-vinyl acetate copolymer resin | "Elvax 3174" | 18%, by wt, vinyl acetate | 8 g/10 min | 61° C. (142°) | 86° C. (149°) |
| ethylene-vinyl acetate copolymer resin | "Elvax 3190" | 25%, by wt, vinyl acetate | 2 g/10 min | 52° C. (126 F) | 77° C. (171° F.) |
| anhydride-modified ethylene acrylate polymer | "Bynel 21E533" | | 7.3 g/10 min | 122° F. | 181° F. |
| modified ethylene acrylate resins | "DuPont Bynel 22E757" | | 8 dg/min | 54° C. (129° F.) | 92° C. (198° F.) |
| acid/acrylate-modified ethylene vinyl acetate polymers | "DuPont Bynel 3101" | | 3.2 dg/min | 65° C. (149° F.) | 87° C. (189° F.) |
| acid/acrylate-modified ethylene vinyl acetate polymers | "Bynel 3120" | | 9.5 dg/min | 57° C. (135° F.) | 87° C. (189° F.) |
| acid/acrylate-modified ethylene vinyl acetate polymers | "Bynel 3126" | | 8.1 dg/min | 60° C. (140° F.) | 87° C. (189° F.) |
| acid-modified ethylene acrylate polymers with medium to high acid comonomer contents | "Bynel 2002" | | 10 dg/min | 60° C. (140° F.) | 91° C. (196° F.) |
| acid-modified ethylene acrylate polymers with medium to high acid comonomer contents | "Bynel 2014 | | 7.9 dg/min ASTM D1238 | 57° C. (135° F.) | 86° C. (187° F.) |
| acid-modified ethylene acrylate polymers with medium to high acid comonomer contents | "Bynel 2022 | | 35 dg/min | 58° C. (136° F.) | 87° C. (189° F.) |

In another embodiment, the seal film comprises a blend of at least two different thermoplastic polymers. The thermoplastic polymers of the blend typically differ with respect to the type of comonomer and/or the amount of comonomer and/or the molecular weight (e.g., melt flow index). The blend may comprise two or more homopolymer(s), copolymer(s), or terpolymers(s). In such embodiments, the blend comprises reaction products of alkylene in an amount of at least about 50% in combination with reaction products of vinyl acetate, alkyl(meth)acrylate monomers, and mixtures thereof.

In some aspects, each of the polymers of the blend comprise reaction products of alkylene in an amount at least about 50% in combination with reaction products of vinyl acetate, alkyl(meth)acrylate monomers, and mixtures thereof.

In other aspects, the blend comprises a first polymer that comprises reaction products of alkylene in an amount at least about 50% in combination with reaction products of vinyl acetate, alkyl(meth)acrylate monomers, and mixtures thereof, and a second polymer that does not include reaction products of vinyl acetate, alkyl (meth)acrylate monomers, and mixtures thereof. The second polymer is typically a polyolefin, comprising a major amount of alkylene (as previously described). Suitable polyolefins include ionomeric ethylene copolymers (e.g., SURLYN-8920 and SURLYN-9910), low density polyethylenes, and polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid). Alternatively the second polymer may be a compatible polyurethane polymer.

The seal film can be monolithic, i.e., a single (substantially homogeneous) layer, as is depicted in FIG. 1A. Alternatively, as depicted in FIG. 1B, the seal film can be multilayered, comprising a seal film layer 31 in contact with at least the body layer or cube-corner elements and an (e.g. outer) second film layer 32. The second film layer may also comprise reaction products of alkylene in an amount of at least about 50% in combination with reaction products of vinyl acetate, alkyl (meth)acrylate monomers, and mixtures thereof. However, the second film layer typically differs from the seal film layer. For example, the second film layer may have a different melt flow index, a higher alkylene content and/or different additives such as pigment. The second film layer may comprise a polyolefin, as just described with respect to the blends. If the second film layer is dissimilar to the seal film layer, a tie layer 33 may be provided between the seal film layer and second layer.

In some embodiments, such as when a monolithic seal film is employed, the seal film has a melt point of at least about 70° C., 75° C., or 80° C. as measured according to ASTM D 3418. Having a sufficiently high melt point or Vicat softening point can be important to insure that the seal film does not deform when exposed to elevated outdoor environmental temperatures. Deformation of the seal film can result in diminished retroreflective performance.

The seal film typically has a relatively low glass transition temperature for cold temperature flexibility and impact resistance. The Tg of the seal film is preferably less than 25° C., more preferably less than 10° C. It is typically preferred that the seal film has a melt index of less than 25 g/10 min as measured according to ASTM D 1238. Alkylene copolymers with high comonomer contents and melt indices are generally more readily melt bonded. However, higher melt indices can result in diminished retroreflective performance.

In the case of commercially available copolymers or terpolymers, the supplier may report the vinyl acetate or other comonomer content. Commercially available films as well as materials suitable for making films can also be analyzed by various known qualitative and quantitative techniques to determine the alkylene, vinyl acetate, and alkyl (meth)acrylate content such as nuclear magnetic resonance, gas chromatography, mass spectrophotometry, and FT-infrared analysis.

The seal film, cube-corner, or body layer composition may optionally comprise one or more reactive (e.g., ethylenically unsaturated) ingredients and/or one or more non-reactive ingredients. Various additives such as solvent, chain transfer agents, colorants (e.g., dyes), antioxidants, light stabilizers, UV absorbers, processing aids such as antiblocking agents, releasing agents, lubricants, and other additives may be added to the body portion or cube-corner elements or seal film as described in U.S. Pat. No. 5,450,235 incorporated herein by reference.

In some embodiments, the seal film further comprises at least one pigment, dye, or combination thereof. It is appreciated that various opacifying agent can be employed in the seal film to improve the whiteness of the sheeting. In at least some embodiments, it is preferred to incorporate from about 5 wt-% to about 30 wt-% of a white pigment into the seal film. A pigment mixture of 20 wt-% of an EVA resin with 80 wt-% $TiO_2$ commercially available from PolyOne Corporation, Avon Lake, Ohio under the trade designation "4048 White VAC" is particularly suitable for addition to ethylene vinyl acetate copolymer based seal films. Since the inclusion of pigment can reduce adhesion, it is also contemplated to employ a multilayered film wherein the seal film layer contacting the body layer or cube-corner elements is light transmissive and one or more outer layers includes pigment.

Cube-corner retroreflective sheetings of the invention can be made by: (a) forming a plurality of cube-corner elements from a light transmissible material; and (b) securing a body layer to the plurality of cube-corner elements. The sheeting can be made according to a variety of known (or later discovered) methods for making cube-corner sheeting, see, for example, U.S. Pat. Nos. 3,689,346; 3,811,983; 4,332,847; 4,601,861; 5,491,586; 5,642,222 and 5,691,846; incorporated herein by reference.

In one embodiment, the method generally comprises providing a (e.g. heated) electroplated nickel tool having a molding surface with a plurality of cavities suitable for forming desired microstructure elements (e.g., cube corner elements of a retroreflective article) and applying to the molding surface a flowable (e.g., curable) resin composition in amount sufficient to at least fill the cavities. The (exposed substantially planar) resin composition surface is then contacted with a body layer film followed by curing the resin to form a composite sheeting comprising an array of microstructure elements (e.g., cube corner elements) bonded to the overlay film. The composite sheeting is removed from the tool followed by applying mechanical stress to the sheeting so as to cause a fractured separation of substantially each individual microstructure element from surrounding microstructure elements, if they were connected by a land. Alternatively, the sheeting may be fractured such that a plurality of cube corner segments are formed, each segment comprising two or more cube corner elements. (See for example U.S. Pat. No. 6,318,867.)

The seal film may be bonded in part or solely to the cube-corner elements. As shown in FIG. 1, as a result of the decoupling of cube corner elements provided on flexible body layers, the sealing layer can be adhered, at least in part, directly to the body layer between independent cube corner elements. Illustrative examples of sealing techniques include radio frequency welding, a conductive heat sealing process, ultrasonic welding, and reactive components, e.g., a sealing material that will develop a bond to the overlay film. Selection of a sealing approach will depend in large part on the nature of the sealing layer and body layer.

The seal films described herein, particularly, the monolithic films lend themselves well to fusing via relatively simple and commonly available thermal techniques. The general practice followed in the art for sealing a thermoplastic layer to a retroreflective cube corner material is to use thermal embossing techniques which result in a form of "chain link" pattern of sealed zones which create sealed pockets of a plurality of individual cube corner elements. Closer inspection of a portion of a leg or "link" of a thermally sealed area indicates that for thermoplastic cube corner elements, the thermal fusion process results in significant distortion of the cube corner elements in fusion zones. This type of thermal distortion of the sealing legs typically extends well beyond the zone of actual sealing due to conductive effects. If an appreciable number of individual cube corner elements in the material are so distributed, the overall optical properties of the sheeting can decrease significantly, e.g., 30 to 40 percent, in comparison to unsealed sheeting.

Radio frequency ("RF") welding is an alternative to thermal fusion. When a radio frequency field is applied to a thermoplastic polymer with polar groups, the tendency of the polar groups to switch orientation in phase with the radio frequency determines the degree to which RF energy is absorbed and converted to kinetic motion of the polar group. This kinetic energy is conducted as heat to the entire polymer molecule; if enough RF energy is applied, the polymer will heat sufficiently to melt. Further information concerning radio frequency bonding of seal films is described in U.S. Pat. No. 5,691,856.

The interface (16 of FIG. 1) between the body layer and the seal film (e.g., layer) or unstructured surface of the (e.g., cube-corner) microstructure layer typically include an adhesion promoting surface treatment. The interface between the body layer and cube-corner may also include an adhesion promoting agent. Various adhesion promoting surface treatments are known and include for example, mechanical roughening, chemical treatment, (air or inert gas such as nitrogen) corona treatment (such as described in US2006/0003178A1, plasma treatment, flame treatment, and actinic radiation. Alternatively or in addition thereto, the adhesion promoting surface treatment may include the application of a tie layer or primer layer. For example, a polyurethane primer layer can be employed by coating and drying an aliphatic polyester urethane dispersion commercially available from K. J. Quinn & Co., Seabrook, N.H. under the trade designation "QC 4820". The interfaces may comprise any combination of adhesion promoting surface treatments.

The cube-corner elements tend to be hard and rigid. The polymeric composition may be thermoplastic, yet particularly in the case of flexible retroreflective sheeting is preferably a reaction product of a polymerizable (i.e., crosslinkable) resin. The elastic modulus of the composition of the cube-corner elements is typically greater than $16 \times 10^8$ pascals, preferably greater than $18 \times 10^8$ pascals, and more preferably is greater than $25 \times 10^8$ pascals. The term "elastic modulus" as used herein means the elastic modulus determined according to ASTM D882-75b using Static Weighing Method A with a 12.5 centimeter (5 inch) initial grip separation, a 2.5 centimeter (1 inch) sample width, and a 2.5 centimeter/minute (1 inch/minute) rate of grip separation.

For embodiments wherein the microstructured article is flexible, the body layer comprises a low elastic modulus polymer for easy bending, curling, flexing, conforming, or stretching. The body layer typically has an elastic modulus less than $13 \times 10^8$ pascals. The elastic modulus may be less than $7 \times 10^8$ pascals, less than $5 \times 10^8$ pascals or less than $3 \times 10^8$ pascals. Generally, the body layer typically has a glass transition temperature that is typically less than 25° C. The body layer typically has a Vicat softening temperature that is at least 50° C. Preferred polymeric materials used in the body layer are resistant to degradation by UV light radiation so that the retroreflective sheeting can be used for long-term outdoor applications.

The resin composition (and process conditions) of the cube-corner elements is preferably chosen such that the resin is capable of penetrating the overlay film and then cured in situ or otherwise solidified, such that after curing an interpenetrating network between the material of the cube corner elements and the material of the overlay film is formed as described in U.S. Pat. No. 5,691,856. When the retroreflective sheeting is examined with an electron microscopy, it is preferred that a blurry boundary rather than a clear interface is observed between the body layer (e.g., film) and the cube corner elements.

During curing or solidification of the cube corner composition, depending on the composition of the cube corner material, individual cube corner elements may experience a certain degree of shrinking. If the elastic modulus of the overlay film is too high, torsional stresses can be applied to the cube corner elements if they shrink during curing. If the stresses are sufficiently high, then the cube corner elements can become distorted with a resulting degradation in optical performance. When the elastic modulus of the overlay film is sufficiently lower than the modulus of the cube corner element material, the overlay film can deform along with the shrinking of cube corner elements without exerting such deformational stresses on the cube corner elements that would lead to undesirable degradation of the optical characteristics.

Thermoplastic compositions employed for forming the cube-corner elements typically have a low linear mold shrinkage, i.e., less than 1 percent. As described in U.S. Pat. No. 5,691,845, the cube corner polymerizable resin compositions typically shrink upon curing. Preferably the resin will shrink at least 5 percent by volume when cured, more preferably between 5 and 20 percent by volume, when cured. The use of resin compositions that shrink is amenable to obtaining minimal or no land thickness.

In general, the modulus differential between the overlay film and the cube corner elements is typically on the order of 1.0 to $1.5 \times 10^7$ pascals or more. As the height of the cube corner elements diminishes, it is possible for this modulus differential to reach the low end of this range presumably because the smaller cube corner elements do not undergo as great of shrinkage during curing.

Various polymeric film substrates comprised of various thermosetting or thermoplastic polymers are suitable for use as the body layer. The body layer may be a single layer or multi-layer film.

Illustrative examples of polymers that may be employed as the body layer film for flexible retroreflective articles include (1) fluorinated polymers such as poly(chlorotrifluoroethylene), poly(tetrafluoroethylene-co-hexafluoropropylene), poly(tetrafluoroethylene-co-perfluoro(alkyl)vinylether), poly(vinylidene fluoride-co-hexafluoropropylene); (2) ionomeric ethylene copolymers poly(ethylene-co-methacrylic acid) with sodium or zinc irons such as SURLYN-8920 Brand and SURLYN-9910 Brand available from E.I. duPont Nemours, Wilmington, Del.; (3) low density polyethylenes such as low density polyethylene; linear low density polyethylene; and very low density polyethylene; plasticized vinyl halide polymers such as plasticized poly(vinylchloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)n$- where n is 0 to 12, and poly(ethylene-co-vinylacetate) "EVA"; and (5) (e.g.) aliphatic polyurethanes.

The body layer is preferably an olefinic polymeric material, typically comprising at least 50 wt-% of an alkylene having 2 to 8 carbon atoms with ethylene and propylene being most commonly employed.

Other body layers include for example poly(ethylene naphthalate), polycarbonate, poly(meth)acrylate (e.g., polymethyl methacrylate or "PMMA"), polyolefins (e.g. polypropylene or "PP"), polyesters (e.g., polyethylene terephthalate or "PET"), polyamides, polyimides, phenolic resins, cellulose diacetate, cellulose triacetate, polystyrene, styrene-acrylonitrile copolymers, cyclic olefin copolymers, epoxies, and the like.

Polymerizable resins suitable for forming the array of cube corner elements may be blends of photoinitiator and at least one compound bearing an acrylate group. Preferably the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of crosslinked resins that may be used in cube corner element arrays of the present invention.

Ethylenically unsaturated resins include both monomeric and polymeric compounds that contain atoms of carbon, hydrogen and oxygen, and optionally nitrogen, sulfur, and the halogens may be used herein. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, and unsaturated carboxylic acids, such as acrylic acid, methacrylic acid, itaconic acid, crotonic acid, iso-crotonic acid, maleic acid, and the like. Such materials are typically readily available commercially and can be readily cross linked. Some illustrative examples of compounds having an acrylic or methacrylic group that are suitable for use are listed below:

(1) Monofunctional Compounds:
ethylacrylate, n-butylacrylate, isobutylacrylate, 2-ethylhexylacrylate, n-hexylacrylate, n-octylacrylate, isooctyl acrylate, bornyl acrylate, tetrahydrofurfuryl acrylate, 2-phenoxyethyl acrylate, and N,N-dimethylacrylamide;

(2) Difunctional Compounds:
1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate; and (3) Polyfunctional Compounds:
trimethylolpropane triacrylate, glyceroltriacrylate, pentaerythritol triacrylate, pentaerythritol tetraacrylate, and tris(2-acryloyloxyethyl)isocyanurate.

Monofunctional compounds typically tend to provide faster penetration of the material of the overlay film and difunctional and polyfunctional compounds typically tend to provide more crosslinked, stronger bonds at the interface between the cube corner elements and overlay film.

Some representative examples of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Cationically polymerizable materials including but are not limited to materials containing epoxy and vinyl ether functional groups may be used herein. These systems are photoinitiated by onium salt initiators, such as triarylsulfonium, and diaryliodonium salts.

The polymerizable resin may comprise a combination of at least one difunctional epoxy (meth)acrylate, at least one difunctional (meth)acrylate monomer, at least one polyfunctional compound having at least three (meth)acrylate groups, and optionally a nitrogen-containing ingredient.

The difunctional epoxy(meth)acrylate, as well as the difunctional (meth)acrylate monomer may be present in the polymerizable composition in an amount of at least about 5 wt-%, 10 wt-%, and any amount there between. Typically, the amount of such difunctional (meth)acrylate monomer does not exceed about 40 wt-%. One exemplary epoxy diacrylate is commercially available from Cytek under the trade designation "Ebecryl 3720".

The polyfunctional compound is typically present in the polymerizable composition in an amount of at least about 10 wt-% (e.g., 15 wt-%, 20 wt-%, 25 wt-%, 30 wt-%, 35 wt-%, 40 wt-% and any amount there between). Typically, the amount of polyfunctional compound is not greater than about 70 wt-%.

Since methacrylate groups tend to be less reactive than acrylate groups, acrylate functionality is preferred.

Radiation (e.g., UV) curable compositions generally include at least one photoinitiator. The photoinitiator or combination of photoiniators can be used at a concentration of about 0.1 to about 10 weight percent. More preferably, the photoinitiator or combination thereof is used at a concentration of about 0.2 to about 3 wt-%.

In general the photoinitiator(s) are at least partially soluble (e.g., at the processing temperature of the resin) and substantially colorless after being polymerized. The photoinitiator may be (e.g., yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

Free radical scavengers or antioxidants may be used, typically, at about 0.01 to 0.5 weight percent. Illustrative examples of suitable antioxidants include hindered phenolic resins such as those available under the trade designations "Irganox 1010", "Irganox 1076", "Irganox 1035", and "Irgafos 168" from Ciba-Geigy Corp.

When thermoplastic polymers are used in the (e.g., cube) microstructures, the glass transition temperature generally is greater than 80° C., and the softening temperature is typically greater than 150° C. Generally, the thermoplastic polymers used in the cube-corner layer are amorphous or semi-crystalline.

Examples of thermoplastic polymers that may be used in the cube-corner elements include acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.
The (e.g., polymerizable or thermoplastic) resin of the cube-corner elements may comprise a nitrogen-containing ingredient, as described in concurrently filed Ser. No. 60/745,033; incorporated herein by reference. Preferred nitrogen-containing ingredients include for example polymerizable amine-containing ingredients, (meth)acrylate functional nitrogen-containing ingredients, and nitrogen-containing polymers.

A common method for improving the uniformity of total light return (TLR) with respect to orientation is tiling, i.e., placing a multiplicity of small tooling sections in more than one orientation in the final production, as described for example in U.S. Pat. No. 4,243,618 (Van Arnam), U.S. Pat. No. 4,202,600; and U.S. Pat. No. 5,936,770 (Nestegard et al.). The resulting sheeting has a first array of cube-corner elements having a different orientation than an adjacent array of cube-corner elements.

The roll of retroreflective sheeting formed has a width bound by longitudinal edges of the roll and a microstructured surface having an array of cube-corner elements, e.g., defined by three mutually intersecting grooves. Depending on the orientation of the tool one of the grooves may be substantially perpendicular, parallel, or at an angle between 0° and 90° to the longitudinal edge of the roll of sheeting.

The retroreflective sheeting is useful for a variety of uses such as traffic signs, pavement markings, vehicle markings and personal safety articles, in view of its flexibility is combination with retroreflected brightness. The coefficient of retroreflection, $R_A$, may be measured according to US Federal Test Method Standard 370 at 4° entrance, 0° orientation, at various observation angles. Retroreflective sheeting typically has a coefficient of retroreflection, $R_A$, at −4° entrance, 0° orientation, and an observation angle of 0.2° of at least 50, 100, 150, 200, or 250 candelas/lux/m$^2$.

Due to the flexibility of the retroreflective sheeting, the sheeting is amendable for application to flexible substrates such as canvas and other fabrics, corrugated and riveted surfaces, as well as curved surfaces having a simple or compound curve. The flexible retroreflective sheeting is also amenable for application to devices subject to thermal expansion and contraction (e.g., traffic devices such as barrels, cones).

Features and advantages of this invention are further illustrated in the following examples. It is to be expressly understood, however, that while the examples serve this purpose, the particular ingredients and amounts used as well as other conditions and details are not to be construed in a manner that would unduly limit the scope of this invention.

Examples 1-5

Articles comprising the seal films of Examples 1-5 in Table 1 were prepared by combining two constructions. The First Construction was the seal film on a polyethylene terephthalate (PET) carrier; the Second Construction was cube corner microstructures laminated to the primer of an EAA film with the primer on one side and a PET carrier on the other side.

The First Construction of Examples 1-5 was prepared by extruding each resin (available from E. I. DuPont de Nemours and Company ("DuPont"; Wilmington. DE)) in Table 1 onto a PET carrier film approximately 15 cm (6 in) wide and 0.05 mm (0.002 in) thick. The melt index, melt point and % vinyl acetate content of each resin in Table 1 was obtained from product data sheets provided on the dupont.com website.

Each resin in Table 1 was fed as pellets into a 1.9 cm (¾ in) single screw extruder available from C. W. Brabender Instruments Inc., South Hackensack, N.J. The extruder temperature profile was from 140° C. (284° F.) to 175° C. (347° F.) resulting in a melt temperature of about 175° C. (347° F.). As the molten resin exited the extruder, it passed through a horizontal die (Ultraflex-40; available from Extrusion Dies Industries LLC, Chippewa Falls, Wis.) and was cast onto the PET carrier described above. The PET carrier was traveling at approximately 3 meters/min (10 ft/min.). The resulting molten seal film on the PET carrier was run between a rubber roll and a chilled steel backup roll to solidify the molten resin into a layer having a thickness of approximately 0.075 mm (0.003 in). Each resultant First Construction was wound to form a roll.

The Second Construction was prepared by casting Primacor 3440 (EAA; available from Dow Chemical Company, Midland, Mich.) as a film at a thickness of 4 mils onto a PET carrier prepared using the extrusion process described above for the First Construction. The EAA surface was coated with QC 4820 primer (an aliphatic polyester urethane available from K.J. Quinn & Co, Seabrook, N.H.) such that it had a final dried thickness of approximately 2.5 microns (0.0001 inch).

Cube corner microstructures were provided on a body layer as described and illustrated in FIG. 5 of U.S. Pat. No. 5,691,846. The cube corner microstructures (prior to separating the structure into individual cubes) had 3 sets of intersecting grooves as shown in FIG. 2 having a pitch (i.e., primary groove spacing) of 0.007" with base triangle apertures of 55.5/55.5/69 degrees resulting in the height of the cube corner elements being 76.2 microns (3.5 mil).

The cube corner microstructures were prepared using a resin composition formed by combining 25 wt-% bisphenol A epoxy diacrylate, commercially available from Cytek under the trade designation "Ebecryl 3720", 12 wt-% dimethylaminoethyl acrylate ("DMAEA"), 38 wt-% TMPTA (trimethylol propane triacrylate) and 25 wt-% 1,6 HDDA (hexanediol diacrylate). The formulation had 0.5 pph of TPO (2,4,6-trimethylbenzoyl diphenylphosphine oxide) photoinitiator.

The resin composition was cast at room temperature at 15 fpm onto a metal tool heated to 140° F. The resin composition filled the cavities of the cube corner microstructures in the tool via a rubber nip roller having a gap set to fill the cavities of the embossed pattern on the tool and minimize the amount of resin on the land area of the tool. The primer layer of the primer/EAA film/PET carrier was brought in contact with the cube corner microstructures of the resin. The cube corner microstructure resin was cured through the PET carrier/EAA film/primer on the tool with one Fusion D UV lamp (available from Fusion Systems, Rockville, Md.) set at 360 W/in. Dichroic filters were used in front of the UV lamps to minimize IR heating of the construction. After curing of the cube corner microstructures on the tool, the composite was removed from the tool and the polymerizable resin side of the composite with the cube corner elements was irradiated by a Fusion D UV lamp operating at 600 W/in to provide a post-UV irradiation cure. The composite was passed through an oven set at 150° F. to relax the stresses in the film.

Each of the First Constructions (seal film/PET carrier) described above was corona treated at an energy of about 2 J/cm² (0.25 kW at 10 fpm). A 2 inch wide strip of 3M™ Polyester Tape 8403 (available from 3M Company), applied across the width of the construction and flush with the edge of the sample, was placed on both the seal film of the First Construction and the cube corner microstructures of the Second Construction to form tape tabs. The tape tabs would to be used later to initiate the peeling process for the 90 degree peel adhesion test.

The First Construction and the Second Construction were laminated using a 12 inch wide laminator composed of a rubber roll and a heated metal emboss roll. The emboss roll had a hexagonal seal pattern thereon. The lamination pressure was 25 psi and line speed was 15 fpm. The First Construction and the Second Construction were fed through the nip of the rolls such that the tape tab on the seal film of the First Construction and the tape tab on the cube corner microstructures of the Second Construction were aligned and face to face to eliminate sealing in the tape tab areas and allow peel initiation for later testing. The PET carrier side of the First Construction was placed independently against the heated emboss roll at temperatures of 300° F. and 375° F. The PET carrier side of the Second Construction was against a rubber roll which had a temperature of about 115° F. due to contact against the heated emboss roll. The article exiting the laminator had the seal film bonded to the cube corner microstructures and 2 tape tabs present to allow peel adhesion initiation.

After the article was allowed to cool to room temperature, the PET carrier was removed from the seal film and the seal film was corona treated at an energy of about 2 J/cm² (0.25 kW at 10 fpm). A 3 mil thick acrylic transfer pressure sensitive adhesive similar to that described in U.S. Pat. No. 6,677,030 on a release liner was laminated to the seal film using a non-heated laminator.

For each Example in Table 1, two test samples, each about 1 inch wide and 8 inches long, were cut from each article, leaving the tape tabs exposed at one end of each test sample. The release liner on the transfer adhesive was removed and the exposed adhesive on the seal film was placed on an untreated 2.75 inch×11 inch aluminum panel (Q Panel Lab Products, Cleveland, Ohio) and rolled back and forth twice with a 2 lb. rubber roller at about 100 inches per minute. The article on the aluminum panel was conditioned at room temperature for 24 hours prior to adhesion testing.

The PET carrier on the EAA film of the article applied to the aluminum panel was removed and a 1 inch wide strip of Scotch® Filament Tape 898 (available from 3M Company) was applied over the tape tab and exposed EAA film of the entire article to prevent stretching of the extensible layers in the article. The aluminum panel was mounted on the sliding table of an Instron tensile tester, ensuring maintenance of a 90 degree peel angle during adhesion testing. The tape tab with the filament tape was placed in the upper jaw of the tensile tester. Peel adhesion testing was performed according to ASTM D3330 at a crosshead speed of 12 inches/min. The peel adhesion values provided in Table 1 are the average of two samples independently made at emboss roll temperatures of 300° F. and 375° F.

TABLE 1

| Ex. | Resin | Melt Index at 190° C./ 2.16 kg (g/10 min) | Melt Point (° C.) | % Vinyl Acetate | Peel Adhesion - 300° F. Emboss Roll (lb/in) | Peel Adhesion - 375° F. Emboss Roll (lb/in) |
|---|---|---|---|---|---|---|
| 1 | ELVAX 3124 | 7 | 98 | 9 | 1.37 | 2.75 |
| 2 | ELVAX 3134Q | 8 | 95 | 12 | 2.59 | 4.53 |
| 3 | ELVAX 3174 | 8 | 86 | 18 | 4.43 | 6.92 |
| 4 | ELVAX 3170 | 2.5 | 87 | 18 | 2.50 | 3.43 |
| 5 | ELVAX 3190 | 2 | 77 | 25 | 2.84 | 3.95 |

The data in Table 1 show that at comparable melt index values the peel adhesion increased as the vinyl acetate content increased (exhibited by Examples 2 and 3). The data also show that at comparable vinyl acetate values the peel adhesion decreased as the melt index decreased (exhibited by Examples 3 and 4).

Examples 6-10 and Comparative Example C1

Examples 6-10 and Comparative Example C1 were prepared as described for Examples 1-5, except that the emboss roll temperature was 315° F. and the resins in Table 2 were used to prepare the seal film for each example.

Comparative Example C1 was prepared as described for Examples 6-10, except that Primacor 3440 was used as the seal film resin. The Primacor 3440 seal film did not adhere to the cube corner microstructures when the First construction and the Second Construction were laminated to form an article.

Samples were prepared and 90 degree peel adhesion measured as described in Examples 1-5. The peel adhesion values are provided in Table 2. The description of the resin, melt index, melt point and Vicat softening point information of Examples 6-10 in Table 2 were obtained from product data sheets provided on the dupont.com website.

TABLE 2

| Ex. | Resin | Description of the Resin | Melt Index at 190° C./2.16 kg (g/10 min) | Melt Point (° C.) | Vicat Softening Point (° C.) | Peel Adhesion - 315° F. Emboss Roll (lb/in) |
|---|---|---|---|---|---|---|
| 6 | BYNEL 3126 | Acid/acrylate-modified EVA | 8.1 | 87 | 60 | 4.87 |
| 7 | BYNEL 2014 | Acid-modified ethylene acrylate | 7.9 | 86 | 57 | 4.37 |
| 8 | BYNEL 21E533 | Anhydride-modified ethylene acrylate | 7.7 | 83 | 50 | 8.72 |
| 9 | BYNEL 22E757 | Modified acrylate copolymer | 8 | 92 | 54 | 8.34 |
| 10 | BYNEL 3101 | Acid/acrylate-modified EVA | 3.2 | 87 | 65 | 4.15 |
| C1 | PRIMACOR 3440 | EAA | | | | 0 |

The data in Table 2 show that the seal films of Examples 6-10 adhered well to the cube corner microstructures with Examples 8 and 9 having the best adhesion. The seal film of Comparative Example C1 did not adhere to the cube corner microstructures.

Examples 11-15 and Comparative Example C2

Examples 11-15 and Comparative Example C2 were prepared as described for Examples 1-5, except that the emboss roll temperature was 300° F. and the seal films were prepared using 80 wt-% of the resin in Table 3 and 20 wt-% 4048 White VAC (a mixture of 20 wt-% of an EVA resin with 80 wt-% TiO2; available from PolyOne Corporation, Avon Lake, Ohio).

Comparative Example C2 was prepared as described for Examples 11-15, except that Krystalgran PNO3 (a polyurethane available form Huntsman Polyurethanes, Houston, Tex.) was used as the seal film resin. Samples were prepared and 90 degree peel adhesion measured as described in Examples 1-5. The peel adhesion values are provided in Table 3.

TABLE 3

| Ex. | Resin with 20% TiO2/EVA | Peel Adhesion - 300° F. Emboss Roll (lb/in) |
|---|---|---|
| 11 | BYNEL 3126 | 2.31 |
| 12 | BYNEL 2014 | 1.97 |
| 13 | BYNEL 21E533 | 5.48 |
| 14 | BYNEL 22E757 | 5.71 |
| 15 | BYNEL 3101 | 1.86 |
| C2 | KRYSTALGRANPNO3 | 0.32 |

The data in Table 3 show that the seal films of Examples 11-15 adhered well to the cube corner microstructures with Examples 13 and 14 having the best adhesion. The seal film of Comparative Example C2 (a polyurethane) had very low adhesion to the cube corner microstructures.

Example 16

Example 16 was prepared as described for Examples 1-5, except that the emboss roll temperature was 300° F. Samples were prepared and 90 degree peel adhesion measured as described in Examples 1-5. The peel adhesion value is provided in Table 4. The description of the resin, melt index and melt point information of Example 16 in Table 4 were obtained from product data sheets provided on the dupont.com website.

TABLE 4

| Ex. | Resin | Description of the Resin | Melt Index at 190° C./2.16 kg (g/10 min) | Melt Point (° C.) | Peel Adhesion - 300° F. Emboss Roll (lb/in) |
|---|---|---|---|---|---|
| 16 | ELVALOY 4924 | Ethylene/vinyl acetate/carbon monoxide copolymer | 15 | 70 | 5.47 |

The peel adhesion value in Table 4 shows that an ethylene/vinyl acetate/carbon monoxide terpolymer adhered well to the cube corner microstructures when used as a seal film.

Example 17 and Comparative Example C3

Example 17 and Comparative Example C3 were prepared as described for Examples 1-5, except that the emboss roll temperature was 300° F. Example 17 was prepared using 10 wt-% SURLYN 1705-1 (available from DuPont) and 90 wt-% BYNEL 3126. Samples were prepared and 90 degree peel adhesion measured as described in Examples 1-5. The peel adhesion values are provided in Table 5. The description of the resin, melt index, melt point and Vicat softening point information of Example C3 in Table 5 were obtained from product data sheets provided on the dupont.com website.

TABLE 5

| Ex. | Resin | Description of the Resin | Melt Index at 190° C./2.16 kg (g/10 min) | Melt Point (° C.) | Vicat Softening Point (° C.) | Peel Adhesion - 315° F. Emboss Roll (lb/in) |
|---|---|---|---|---|---|---|
| 17 | 10% SURLYN 1705-1/90% BYNEL 3126 | | | | | 3.67 |
| C3 | SURLYN 1705-1 | Zinc ionomer of ethylene methacrylic acid | 5-5 | 95 | 65 | 0.26 |

The data in Table 5 show that a seal film can be produced by blending materials having different cube corner adhesion properties. In Table 5 SURLYN 1705-1 of Comparative Example C3 was a poor seal film material, but when blended with 90 wt-% BYNEL 3126, the blended composition adhered well to the cube corner microstructures.

The coefficient of retroreflection, $R_A$, of the resulting cube-corner sheeting of Example 10 was evaluated according to US Federal Test Method Standard 370 using an observation angle of 0.2°, an orientation of 0° and an entrance angle of −4°. The average $R_A$ of four measurements was 639 candelas/lux/m².

What is claimed is:

1. A flexible retroreflective article comprising:
a polymeric light transmissive body layer having an elastic modulus of less than 7×10⁸ pascals;
a plurality of cube-corner elements projecting from a major surface of the body layer; and
a single layer or multilayered seal film adhered to at least portions of the body layer such that the seal film maintains an air interface with the cube-corner elements;
wherein the seal film layer is a thermoplastic polymeric material comprising reaction products of alkylene in an amount of at least about 50% by weight and vinyl acetate in an amount of less than 25 wt %;
wherein the seal film has a melt index of less than 25 g/10 min as measured according to ASTM D 1238.

2. The flexible retroreflective article of claim 1, wherein the thermoplastic polymeric material comprises acid modification, anhydride modification, carbon monoxide modification, and combinations thereof.

3. The flexible retroreflective article of claim 1, wherein the alkylene has 2 to 8 carbon atoms.

4. The flexible retroreflective article of claim 3, wherein the alkylene is ethylene.

5. The flexible retroreflective article of claim 1, wherein the seal film includes alkyl (meth)acrylate monomers.

6. The flexible retroreflective article of claim 5, wherein the alkyl (meth)acrylate monomers have an alkyl group having 1 to 8 carbon atoms.

7. The flexible retroreflective article of claim 5, wherein the alkyl (meth)acrylate monomers are selected from the group consisting of methyl acrylate, methyl methacrylate, ethyl acrylate, ethyl methacrylate, butyl acrylate, butyl methacrylate and mixtures thereof.

8. The flexible retroreflective article of claim 1, wherein the seal film comprises a copolymer or terpolymer of alkylene and at least one non-acid polar comonomer selected from vinyl acetate, alkyl (meth)acrylate monomers, and mixtures thereof.

9. The flexible retroreflective article of claim 8, wherein the copolymer or terpolymer comprises about 10 wt-% to about 40 wt-% of vinyl acetate, alkyl (meth)acrylate monomers, and mixtures thereof.

10. The flexible retroreflective article of claim 1, wherein the seal film includes at least one of EVA copolymers, acid- or anhydride-modified EVA, acid or anhydride-/acrylate-modified EVA, ethylene ethyl acrylate copolymers, ethylene methyl acrylate copolymers, acid- or anhydride-modified ethylene acrylate polymers, and EVA carbon monoxide terpolymers.

11. The flexible retroreflective article of claim 1, wherein the seal film comprises a blend of at least two thermoplastic polymers and the blend comprises reaction products of alkylene in an amount of at least about 50% and reaction products of vinyl acetate, alkyl (meth)acrylate monomers, and mixtures thereof.

12. The flexible retroreflective article of claim 11, wherein the blend comprises a thermoplastic polymer selected from ionomeric ethylene compolymers, low density polyethylene, EAA, EMA, and polyurethanes.

13. The flexible retroreflective article of claim 1, wherein the seal film further comprises at least one pigment, dye, or combination thereof.

14. The flexible retroreflective article of claim 1, wherein the seal film is monolithic.

15. The flexible retroreflective article of claim 1, wherein the seal film is multilayered having a seal film layer disposed between the cube-corner elements and a second film layer.

16. The flexible retroreflective article of claim 15, wherein the second film layer is selected from
a) film compositions comprising reaction products of alkylene in an amount of at least about 50% by weight and vinyl acetate in an amount of less than 25 wt % and further comprise 5 wt-% to 20 wt-% of pigment,
b) film compositions comprising reaction products of alkylene in an amount of at least about 50% by weight and vinyl acetate in an amount of less than 25 wt % and a different melt flow index than the seal film layer, and
c) film compositions comprising different reaction products other than alkylene in an amount of at least about 50% by weight and vinyl acetate in an amount of less than 25 wt % and optionally include a tie layer between the seal film layer and the second film layer.

17. The flexible retroreflective article of claim 1, wherein the seal-film contacts the body layer or cube film at an interface and the interface further comprises an adhesion promoting surface treatment.

18. The flexible retroreflective article of claim 17, wherein the adhesion promoting surface treatment comprises a prime layer, corona treatment, or a combination thereof.

19. The flexible retroreflective article of claim 1, wherein the body layer comprises a polymeric material selected from ionomeric ethylene copolymers, low density polyethylenes, polyethylene copolymers, plasticized poly(vinylchloride), polyurethane, and mixtures thereof.

20. The flexible retroreflective article of claim 1, wherein the body layer is olefinic.

21. A retroreflective article that comprises:
a plurality of cube-corner elements; and
a seal film layer adhered to portions of the cube-corner elements such that the seal film layer maintains an air interface with the cube-corner elements;
wherein the seal film layer is a thermoplastic polymeric material comprising reaction products of alkylene in an amount of at least about 50% by weight and vinyl acetate in an amount of less than 25 wt %;
wherein the seal film has a melt index of less than 25 g/10 min as measured according to ASTM D 1238.

22. The retroreflective article of claim 21, wherein the cube-corner elements project from an integral body layer.

23. The retroreflective article of claim 21, wherein the cube-corner elements comprise a thermoplastic polymeric material.

24. The retroreflective article of claim 21, wherein the cube-corner elements comprise the reaction product of a polymerizable resin composition.

25. The retroreflective article of claim 21, wherein the cube-corner elements comprise at least one nitrogen-containing ingredient.

26. A microstructured article that comprising
a plurality of microstructured elements; and
a seal film adhered to portions of the cube-corner elements such that the seal film maintains an air interface with the microstructured elements;
wherein the seal film layer is a thermoplastic polymeric material comprising reaction products of alkylene in an amount of at least about 50% by weight and reaction products of vinyl acetate in an amount of less than 10 wt %;
wherein the seal film has a melt index of less than 25 g/10 min as measured according to ASTM D 1238.

* * * * *

UNITED STATES PATENT AND TRADEMARK OFFICE
CERTIFICATE OF CORRECTION

PATENT NO. : 8,297,761 B2
APPLICATION NO. : 12/562243
DATED : October 30, 2012
INVENTOR(S) : Bimal Vasant Thakkar Page 1 of 2

It is certified that error appears in the above-identified patent and that said Letters Patent is hereby corrected as shown below:

In the Specifications

Column 5
Line 27, delete "thereof," and insert -- thereof; --

Line 32, after "wt-%-" insert -- . --

Column 6
Line 8 (approx.), delete "(142°)" and insert -- (142° F.) --

Line 8 (approx.), delete "(149°)" and insert -- (149° F.) --

Line 9 (approx.), delete "(126 F)" and insert -- (126° F.) --

Column 7
Line 19, delete "thereof," and insert -- thereof; --

Column 10
Line 67, delete "poly(vinychloride);" and insert -- poly(vinylchloride); --

Column 11
Line 7, delete "(CH$_2$)n-" and insert -- (CH$_2$)$_n$ --

Column 12
Line 40, delete "photoiniators" and insert -- photoinitiators --

Lines 52-53, delete "trimethylbenzoydiphenylphosphine"

Signed and Sealed this
Thirtieth Day of July, 2013

Teresa Stanek Rea
*Acting Director of the United States Patent and Trademark Office*

CERTIFICATE OF CORRECTION (continued)
U.S. Pat. No. 8,297,761 B2

Column 13
Line 63, delete "4°" and insert -- -4° --

Column 17
Line 31, delete "TiO2;" and insert -- TiO$_2$; --

Line 34, delete "form" and insert -- from --

Line 43 (approx.), delete "TiO2/EVA" and insert -- TiO$_2$/EVA --

In the Claims

Column 19
Line 65, in claim 12, delete "compolymers" and insert -- copolymers, --

Column 20
Line 30, in claim 19, delete "poly(vinychloride)," and insert -- poly(vinylchloride), --